United States Patent [19]
Gatti et al.

[11] Patent Number: 5,861,089
[45] Date of Patent: Jan. 19, 1999

[54] ELECTRIC FIELD ENHANCED COALESCENCE OF EMULSIONS COMPRISING A SILICON CONTAINING COMPOUND OR SILICON CONTAINING POLYMER

[75] Inventors: Christopher Darren Gatti, Hebron, Ky.; Charles Alan Hall, Madison, Ind.; Roland Lee Halm, Midland, Mich.

[73] Assignee: Dow Corning Corporation, Midland, Mich.

[21] Appl. No.: 747,531

[22] Filed: Nov. 12, 1996

[51] Int. Cl.⁶ .......................... B01D 17/06; B01D 57/00; C10G 32/02; C10G 33/02
[52] U.S. Cl. .................... 204/563; 204/564; 204/565; 204/567; 204/569; 204/573
[58] Field of Search ........................ 204/563, 564, 204/565, 567, 569, 573

[56] References Cited

U.S. PATENT DOCUMENTS

| | | | |
|---|---|---|---|
| 3,207,686 | 9/1965 | Jarvis et al. | 204/302 |
| 3,342,720 | 9/1967 | Turner | 204/302 |
| 3,772,180 | 11/1973 | Prestridge | 204/305 |
| 3,847,775 | 11/1974 | Prestridge | 204/191 |
| 3,939,395 | 2/1976 | Prestridge et al. | 323/4 |
| 4,056,451 | 11/1977 | Hodgson | 204/305 |
| 4,126,537 | 11/1978 | Prestridge | 204/302 |
| 4,308,127 | 12/1981 | Prestridge et al. | 204/302 |
| 4,545,914 | 10/1985 | Graiver et al. | 252/511 |

FOREIGN PATENT DOCUMENTS 589440  3/1994  European Pat. Off. .

Primary Examiner—Kathryn L. Gorgos
Assistant Examiner—Edna Wong
Attorney, Agent, or Firm—William F. Boley

[57] ABSTRACT

A process for separating an emulsion into separate and easily recoverable phases. The process comprises exposing an emulsion comprising a discontinuous phase and a non-conducting continuous phase to an electric field thereby effecting coalescence of the discontinuous phase into droplets of a size for effective gravitation from the continuous phase, where the discontinuous phase and the continuous phase have different dielectric constants and densities and at least one of the phases comprise a silicon containing compound or a silicon containing polymer. The present process is especially useful for separating emulsions where the discontinuous phase is an aqueous acid solution and the continuous phase is diorganopolysiloxane.

20 Claims, 2 Drawing Sheets

ELECTRIC FIELD ENHANCED COALESCENCE OF EMULSIONS COMPRISING A SILICON CONTAINING COMPOUND OR SILICON CONTAINING POLYMER

BACKGROUND OF INVENTION

The present invention is a process for separating an emulsion by electric field enhanced coalescence, where the emulsion comprises a discontinuous phase and a non-conducting continuous phase and the two phases have different dielectric constants and densities and at least one of the phases comprises a silicon containing compound or a silicon containing polymer. The emulsion is exposed to an electric field thereby effecting coalescence of the discontinuous phase into droplets of a size for effective gravitation from the continuous phase.

The use of high voltage electric fields to force the separation of oil field emulsions is a well known and accepted practice in the petroleum industry. These fields greatly speed the coalescence and separation of immiscible liquids, over conventional heat treaters and settlers using mechanical aids to coalescence.

Jarvis et al., U.S. Pat. No. 3,207,686, describe an electric dehydrator using an alternating current (AC) applied to an electrode to effect the separation of a water and crude oil dispersion containing gases. Jarvis et al. state that the continuous phase may be crude oil or other oils of relatively high resistivity.

Turner, U.S. Pat. No. 3,342,720, describes an improvement to electric treaters for treating oil-continuous dispersions to separate the oil from the dispersed phase. The improvement is described as a dispersion-treating electrode structure for such a treater and an arrangement of elements electrically insulating and stabilizing the energized electrode on an electric treater while supplying access to the insulation from the exterior of the treater.

In a processes for dehydrating crude petroleum-aqueous emulsions by effecting coalescence in an electric field, the nature of the current provided to the electrodes is considered important in determining the efficiency of the process. It is believed that an electric field created by an AC voltage source is more effective in separating relatively wet emulsions while an electric field created by a direct current (DC) source may be more effective in separating those dryer emulsions where particle size of the aqueous phase is small. Therefore apparatuses employing electrical fields having both AC and DC characteristics have been described.

Prestridge, U.S. Pat. No. 3,772,180, describes a system for generating a plurality of electric fields through which a mixture of water and oil is flowed for sequential exposure to fields as forces for coalescing droplets of the water into sizes great enough for their effective gravitation from the oil. More particularly, the invention is described as applying a form of DC voltage to an electrode system suspended in the mixture to generate the plurality of fields which will first function as a field generated by AC voltage and secondly as a field generated by DC voltage which will cause an ordered migration of dispersed water droplets relative to the electrodes.

Prestridge, U.S. Pat. No. 3,772,180, claims a process for coalescing water using the system described in Prestridge, U.S. Pat. No. 3,772,180, as discussed above.

Prestridge et al., U.S. Pat. No. 3,939,395, describe a rectified AC power supply for use in an apparatus for effecting separation of an aqueous emulsion by passing the emulsion through an electric field.

Hodgson, U.S. Pat. No. 4,054,451, describes an electric treater for separation of a water-in-oil emulsion, which utilizes both AC potential applied to electrodes as well as DC potential. A plurality of trays are provided through which the emulsion passes in series. The emulsion first passes through the tray or trays which have an AC potential applied to them, and then passes successively through trays which have a pulsed DC potential applied to them.

Prestridge et al., U.S. Pat. No. 4,308,127, describe an apparatus for reducing the aqueous phase of a liquid emulsion where the continuous phase has a low dielectric constant. In the apparatus a plurality of electric fields is arranged to progressively separate the liquid phases. The emulsions are first passed through one of the electric fields between insulated electrodes. With the breaking of the emulsion begun by the first electric field, the emulsion next flows in an electric field formed by applying an AC potential to uninsulated electrodes. The final stage is the passing of the almost completely broken emulsion through an electric field between electrodes having a DC potential which are arranged to systematically degrade their field.

Prestridge, U.S. Pat. No. 4,126,537, observes that one of the problems in using electric fields to effect separation of emulsions is centered in the fields strength. When the field begins to coalesce the dispersed drops its force upon the enlarging drops greatly increases. With the field strength constant, the enlarged drops travel in the second fluid fast enough to develop shear forces with the liquid in which they are dispersed to separate, or fragment the enlarged drops. Prestridge describes an apparatus providing a flow path for an emulsion through an electric field with a decreasing voltage gradient in the direction of the flow of the mixture along the path, thereby reducing fragmentation of the droplets by shear force. The decreasing voltage gradient is achieved by a gradual increasing of the distance between the electrodes.

The above described patents specifically address the problems associated with dehydrating crude oil and petroleum distillates in the petroleum industry. The described patents do not recognize that silicon containing compounds and silicon containing polymers represent unique materials that may exist in emulsion with other liquids and that such emulsions in which the two phases have different dielectric constants and densities may be separated by exposure to an electric field to enhance coalescence of the discontinuous phase into droplets of a size for effective gravitation from the continuous phase.

SUMMARY OF INVENTION

The invention is a process for separating an emulsion into separate and easily recoverable phases. The process comprises exposing an emulsion comprising a discontinuous phase and a non-conducting continuous phase to an electric field thereby effecting coalescence of the discontinuous phase into droplets of a size for effective gravitation from the continuous phase, where the discontinuous phase and the continuous phase have different dielectric constants and densities and at least one of the phases comprise a silicon containing compound or a silicon containing polymer. The present process is especially useful for separating emulsions where the discontinuous phase is an aqueous acid solution and the continuous phase is diorganopolysiloxane.

DESCRIPTION OF INVENTION

The present invention is a process for separating an emulsion into separate and easily recoverable phases. The process comprises exposing an emulsion comprising a liquid discontinuous phase and a liquid non-conducting continuous phase to an electric field thereby effecting coalescence of the discontinuous phase into droplets of a size for effective gravitation from the continuous phase, where the discontinuous phase and the continuous phase have different dielectric constants and densities and at least one of the phases comprise a silicon containing compound or silicon containing polymer.

Figure 1:
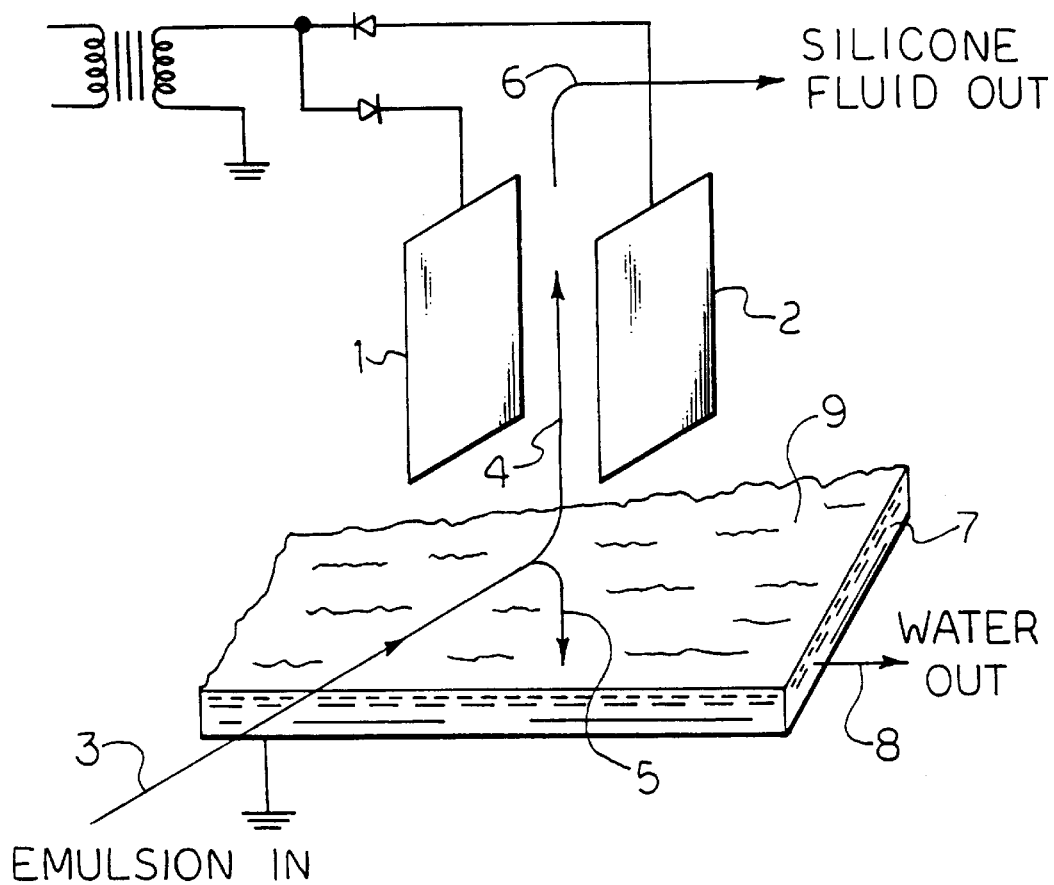
FIG. 1 is a schematic overview of an embodiment of the present process as it relates to the separation of an emulsion of water in a polydiorganosiloxane polymer.

The method of exposing the emulsion to the electric field and the apparatus for effecting such exposure is not critical to the present invention and can be any of those known in the art. By way of example, an overview of an embodiment of the present process where the continuous phase is a silicone fluid such as polydimethylsiloxane and the discontinuous phase is water is presented in FIG. 1. In FIG. 1 electrodes 1 and 2 are shown, arranged vertically and parallel to each other and to the flow of fluids within a treater shell. The emulsion is directed toward the electrodes along path 3 which is generally lower than the electrodes. The flow of the emulsion from path 3 is then directed upward along path 4. Any water droplets that coalesce to a size large enough to gravitate from the emulsion travel downward along path 5. After this treatment by exposure to the electric fields, the silicone fluid continues upward along path 6 for delivery as a dehydrated product of the process.

The water which is separated from the emulsion flowing along path 5, collects as bulk water 7. A controlled removal of water from bulk water 7 is effected along path 8. The controlled removal of water is exerted to maintain water interface 9 at a predetermined distance below electrodes 1 and 2. In FIG. 1, the potential applied to the electrodes is shown as a DC voltage generated by rectifying AC voltage into half-wave negative and positive components thereby providing a pulsed positive DC voltage to one electrode and a pulsed DC negative voltage to the other electrode.

The nature of the electrical potential supplied to the electrodes in FIG. 1 is not meant to be limiting on the present process and such electrical potential can be supplied as an AC potential, DC potential, pulsed DC potential, a combination of AC and DC potentials, or as an electrical potential having both AC and DC characteristics. One preferred process uses one or more pairs of electrodes connected to an AC energized transformer, one end of the transformer secondary winding being connected to earth and the other connected to the electrodes through rectifier elements such that the AC supply is split into its pulsed unidirectional components. On each half cycle of the AC voltage source, voltage is applied to one electrode of the pair while the other electrode of the pair has no voltage applied to it. A fluctuating unidirectional field is therefore produced between the electrodes by the alternate pulsing of one electrode positive and the other electrode negative. Under conditions as described in FIG. 1, the pulsating DC voltage applied to the electrodes may establish a field of an AC nature between the ends of the electrodes and water interface 9 which is maintained at earth potential.

Figure 2:
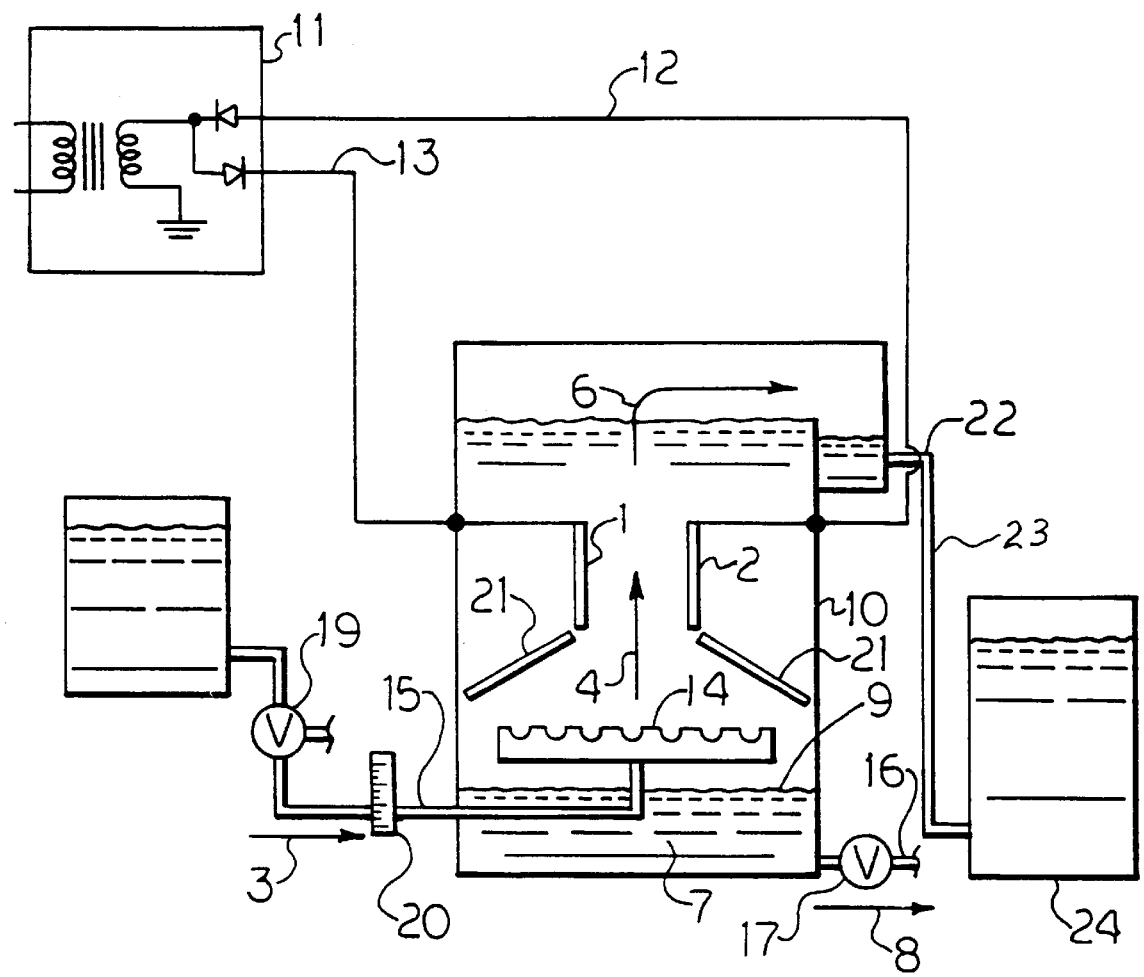
FIG. 2 is a schematic representation of significant elements of an apparatus suitable for conduct of the present process.

The method of exposure of the emulsion to the electric field and an apparatus suitable for such exposure is further explained by reference to FIG. 2. In FIG. 2 electrodes 1 and 2 are shown arranged vertically and parallel to each other and to the flow of fluids within treater shell 10. Electrodes 1 and 2 are connected to power supply 11 by means of electrical leads 12 and 13. Power supply 11 is a rectified AC voltage providing a pulsating DC voltage to the electrodes. Also positioned within treater shell 10 is distributor 14. Distributor 14 can be of conventual design and can comprise for example a notched or perforated inverted conduit having an H-shaped configuration. Emulsion is fed to distributor 14 along path 3 consisting of feed conduit 15 having position therein feed control valve 19 and flow meter 20. Feed control valve 19 is used to control the rate of feed of emulsion to distributor 14. The emulsion is preferably fed into treater shell 10 at a level below distributor 14 and above water interface 9.

Water interface 9 is kept at a relatively constant level below distributor 14 by removal of bulk water 7 from treater shell 10 through outlet 16. The exit of bulk water 7 from the treater shell is controlled by means of outlet valve 17 which may be connected to an automatic level control system such as a float valve arrangement. The emulsion exiting distributor 14 is channeled by channeling plates 21 along path 4 passing between electrodes 1 and 2. The purpose of channeling plates 21 is to ensure the emulsion passes along path 4 and not behind electrodes 1 and 2. Channeling plates 21 can be made of an inert non-conductive material such as Teflon (R) (Dupont Corporation, Wilmington, Del.). As the emulsion passes between electrodes 1 and 2 coalescence of the aqueous phase is effected causing the formation of drops large enough to settle by gravitation from the emulsion. The aqueous drops settle into bulk water 7. The dehydrated silicone fluid continues upward along path 6 through treater shell 10 exiting at fluid outlet 22 and passes through conduit 23 to storage container 24.

It will be readily appreciated by those skilled in the art that the embodiments of the present invention as described by reference to FIG. 1 and FIG. 2 are not limiting on the present invention as claimed herein. More, specifically the number, configuration, design, and location of the electrodes; the type of voltage supplied to the electrodes, including method of control; the distributor, number, design and location; the methods for feeding dispersion to the electric field coalescer unit; and methods for removing separated components from the electric field coalescer unit can be any of those typically associated with such processes. Specific examples of electric field coalescer units which may be useful in the present process include those described in Turner, U.S. Pat. No. 3,342,720; Jarvis et al., U.S. Pat. No. 3,207,686; Prestridge, U.S. Pat. No. 3,772,180; Hodgson, U.S. Pat. No. 4,056,451; and Prestridge, U.S. Pat. No. 4,126,537, all of which are incorporated by reference for their teaching of such useful electric field coalescer units.

Emulsions that can be separated by the present process comprise at least two immiscible liquids where one of the liquids is non-conducting and is present as a continuous phase. By "non-conducting" it is meant the liquid comprising the continuous phase has a conductivity such that the dielectric resistance between energized electrodes is maintained high enough to sustain an electric field between electrodes sufficient to effect coalescence of the discontinuous phase.

The nature of the continuous phase is limiting only in that under process conditions the continuous phase be non-conductive as described above and have a dielectric constant and density different than that of the discontinuous phase. The continuous phase can be, for example, an organic solvent such as toluene, xylene, benzene, and heptane.

Preferred is when the continuous phase comprises a silicon containing compound or a silicon containing polymer. By silicon containing compounds it is meant those chemical entities comprising at least one silicon atom and being non-polymeric in structure. Examples of silicon containing compounds which may comprise the continuous phase of an emulsion separable by the present process include silanes described by formula

$$R^1_a H_b SiX_{4-a-b}, \qquad (1)$$

where each $R^1$ is an independently selected monovalent hydrocarbon radical comprising 1 to about 12 carbon atoms, X is a halogen atom, a=0 to 4, b=0 to 2, and a+b=0 to 4. Each $R^1$ can be selected, for example, from a group consisting of substituted and unsubstituted alkyls, cycloalkyls, alkenyls, araalkyls, and aryls. $R^1$ can be, for example, methyl, ethyl, chloromethyl, 3,3,3-trifluoropropyl, cyclopentyl, cyclohexyl, vinyl, allyl, 5-hexenyl, benzyl, beta-phenylethyl, phenyl, tolyl, xylyl, naphthyl, and chlorophenyl. Preferred is when $R^1$ is methyl. In Formula 1, each X can be an independently selected halogen atom. Preferred in Formula 1 is where X is chlorine.

The continuous phase of an emulsion separable by the present process can be a silicon containing polymer. By silicon containing polymer it is meant those polymers in which the silicon atom is a substituent of the repeating units forming the polymer backbone chain. Examples of such silicon containing polymers include linear, branched, and cyclic siloxanes; silicone resin precursors; polysilanes; and mixtures of two or more of the described silicon containing polymers.

The silicon containing polymer can be, for example, a linear siloxane described by formula

$$R^2 R^3_2 O(SiR^3_2 O)_z SiR^3_2 R^2, \qquad (2)$$

where each $R^2$ is independently selected from the group consisting of halogen, hydroxy, and $R^3$; each $R^3$ is independently selected from the group consisting of hydrogen and monovalent hydrocarbon radicals comprising 1 to about 12 carbon atoms and z is a value within a range of 0 to about 100,000. In formula (2), it is preferred that each $R^2$ be independently selected from the group consisting of, chlorine, hydroxy, and methyl. In formula (2), $R^3$ can be, in addition to hydrogen, a substituted or unsubstituted alkyl, cycloalkyl, alkenyl, and aryl as described for $R^1$. Preferred is where in formula (2) at least 50 mole percent of the $R^3$ substituents on silicon are methyl. In formula (2) it is preferred that z be a value within a range of 0 to about 700. More preferred is when the value z in formula (2) is within a range of 0 to about 200.

The silicon containing polymer can be, for example, a cyclic siloxane described by formula

$$(R^3_2 SiO)_m, \qquad (3)$$

where $R^3$ is as previously described and m is a value within a range of 3 to about 20. Preferred is where m is a value within a range of 3 to about 7.

The silicon containing polymer can be a branched polymer suitable as a precursor for forming a silicone resin formed of units described by formulas $R^3_3 SiO_{1/2}$, $R^3_2 SiO_{2/2}$, $R^3 SiO_{3/2}$, and $SiO_{4/2}$, where $R^3$ is as previously described.

The silicon containing polymer can be, for example, a polysilane described by formula

$$R^4_3 Si(SiR^4_2)_n SiR^4_3, \qquad (4)$$

where each $R^4$ can be independently selected from the group consisting of hydrogen, halogen, $R^1$ as previously described, and n is a value within a range of 0 to about 1,000.

The present process is particularly useful for reducing residual water and chloride present in polysiloxanes prepared by the hydrolysis of organochlorosilanes. Such a hydrolysis process is described, for example, in Bokerman et al., U.S. Pat. No. 5,075,479, which is incorporated by reference for its teaching of emulsions comprising silicon containing polymers as a continuous phase and an aqueous acid as a discontinuous phase which can be separated by the present process.

The discontinuous phase of the present process can be any liquid immiscible with the continuous phase and having a dielectric constant and density different than that of the continuous phase. The discontinuous phase can be an organic solvent, silicon containing compound, or silicon containing polymer such as described for the continuous phase; water; or aqueous acid. Within the limitations described for the continuous phase and the discontinuous phase, the present process may be used to remove residual amount of silicon containing compounds and silicon containing polymers from solvents to facilitate recovery and recycling or disposal of the solvents. In a preferred process the discontinuous phase of the emulsion is an aqueous acid such as results from the hydrolysis of organohalosilanes to form organopolysiloxanes. The discontinuous phase can be, for example, aqueous hydrogen chloride.

The discontinuous phase of the emulsion must have a different dielectric constant than that of the continuous phase. The required difference in dielectric constant is dependent upon the particular configuration of electric field coalescer used to effect the present process and can be easily determined without undue experimentation by those skilled in the art. Generally, the dielectric constant of the discontinuous phase must be sufficiently different from that of the continuous phase to allow for migration of the droplets forming the discontinuous phase within the electric field created between charged electrodes. The discontinuous phase can be electrically conductive. Examples of materials having differing dielectric constants that can be separated by the present process are provided herein.

The material comprising the discontinuous phase must also have a different density than that of the material comprising the continuous phase. The present process effects coalescence of the discontinuous phase into droplets of a size for effective gravitation from the continuous phase. Therefore, the density of the material comprising the discontinuous phase must be such that coalesced droplets of the discontinuous phase can be separated from the continuous phase based upon their buoyancy or settling in the continuous phase. In the present process the coalesced droplets of the discontinuous phase can have a density that allows them to either migrate up or down within the continuous phase to effect a phase separation. In a preferred process the discontinuous phase has a density greater than that of the continuous phase causing the coalesced droplets of the discontinuous phase to settle toward the bottom of an electric field coalescer apparatus such as described herein.

In the present process when the continuous phase is a silicon containing polymer, it may be desirable to add water to the process to facilitate reduction of residual chlorine content of the silicon polymer. The added water comprising at least a portion of the discontinuous phase of the emulsion may facilitate hydrolysis of chlorine atoms bonded to silicon atoms, thereby facilitating removal of chlorine from the silicon containing polymer.

The following examples are provided to illustrate the present invention. These examples are not intended to limit the scope of the claims herein.

EXAMPLE 1

The ability to dehydrate and reduce the chlorine content of a polydimethylsiloxane (PDMS) fluid by electric field enhanced coalescence was evaluated. Aqueous hydrogen chloride solution having the acid concentration described in Table 1 (Inlet HCl) was emulsified in a polydimethylsiloxane fluid having a viscosity of about 0.1 Pa·s at 25° C. The volume percent water (Inlet %$H_2O$) and parts per million chloride (PPM Cl) in the emulsion is described in Table 1 for each run. The particle size of the aqueous acid phase in the emulsion was determined to be 20 microns or less with a median particle size of 10 microns as measure by use of a particle size analyzer (Lasentec Sensor Technology, Inc., Bellevue, Wash.). The emulsion was fed to an electric coalescer similar to that described in FIG. 2. The volume capacity of the coalescer was 17 gallons. The coalescer was supplied with a rectified voltage of about 18 kV and the emulsion was fed to the coalescer at a rate of about 1200 ml/m. It was determined that the coalescer reached a steady state condition after 2.5 vessel displacements and a sample of the polydimethylsiloxane exiting the coalescer was collected and analyzed at this point for the volume percent water (Outlet %$H_2O$) and parts per million (PPM) chloride (Outlet PPM Cl). The volume percent water in the outlet stream was determined by standard methods using centrifugation to effect separation. The PPM Cl in the outlet stream was determined by ion chromatography (IC). The results of the analysis are reported in Table 1.

TABLE 1

PDMS Dehydration and Chloride Removal

| Run | Temp. (°C.) | Inlet HCL Conc. (Wt. %) | Inlet | | Outlet | |
|---|---|---|---|---|---|---|
| | | | % $H_2O$ | PPM Cl | % $H_2O$ | PPM Cl |
| 1 | 38 | 1–1.1 | 2.4 | 250 | trace | 2.8 |
| 2 | 31 | 2–2.1 | 2.3 | 473 | trace | 0.6 |
| 3 | 24 | 8.4–8.5 | 9 | 7594 | 0.02 | 2.7 |

EXAMPLE 2

The effect of the feed velocity on separation of an emulsion of water in polydimethylsiloxane in and electric field coalescer was evaluated. An emulsion of water in polydimethylsiloxane fluid having a viscosity of about 0.1 Pa·s at 25° C. was created. The water droplet size in the emulsion was similar to that described in Example 1. The emulsion was fed to the electric field coalescer described in Example 1 at various feed rates (Feed Rate) as described in Table 2 providing a velocity (Velocity) within the coalescer as described in Table 2. The coalescer was run at ambient temperature. The volume percent water emulsified in the polydimethylsiloxane fed to the reactor (Inlet %$H_2O$) and the volume percent water in the polydimethylsiloxane exiting the reactor (Outlet %$H_2O$) are reported in Table 2. The weight percent water was determined by standard methods using centrifugation to effect separation.

TABLE 2

Effect of Emulsion Feed Velocity on Dehydration

| Feed Rate (ml/s) | Velocity (×$10^3$ m/s) | Inlet % $H_2O$ | Outlet % $H_2O$ |
|---|---|---|---|
| 20 | 1.29 | 8 | 0.03 |
| 40 | 2.59 | 5.5 | 0.07 |
| 56 | 3.63 | 5.5 | 0.10 |
| 80 | 5.78 | 6 | 0.12 |
| 160 | 10.31 | 5 | 0.40 |

EXAMPLE 3

The effect of the voltage applied to the electric field coalescer on the ability to separate a water in polydimethylsiloxane emulsion was evaluated. An emulsion of water in polydimethylsiloxane fluid having a viscosity of about 0.1 Pa·s at 25° C. was created. The volume percent of water emulsified in the polydimethylsiloxane fluid is reported in Table 3 (Inlet %$H_2O$). The water droplet size in the emulsion was similar to that described in Example 1. The emulsion was fed to the electrostatic coalescer described in Example 1 at 1200 ml/m at various applied voltages as described in Table 3. The coalescer was run at ambient temperature. Incremental increases in the applied voltage to the coalescer were made as described in Table 3. At each voltage the coalescer was allowed to reach steady state as described in Example 1 before a sample was taken from the exit stream for analysis. The volume percent water emulsified in the polydimethylsiloxane fluid fed to the reactor (Inlet %$H_2O$) and the volume percent water in the polydimethylsiloxane fluid exiting the reactor (Outlet %$H_2O$) are reported in Table 2. The volume percent water was determined in the outlet liquid by standard methods using centrifugation to effect separation.

TABLE 3

Effects of Applied Voltage on Dehydration of PDMS

| Applied Voltage (kV) | Inlet % $H_2O$ | Outlet % $H_2O$ |
|---|---|---|
| 18 | 2.2 | 0.050 |
| 20 | 2.3 | 0.035 |
| 22 | 2.5 | 0.035 |
| 24 | 2.7 | 0.035 |
| 26 | 2.5 | 0.035 |
| 28 | 2.6 | 0.035 |
| 30 | 2.6 | 0.035 |
| 32 | 2.5 | 0.030 |
| 34 | 2.6 | 0.020 |
| 36 | 2.6 | 0.020 |
| 38 | 2.7 | 0.020 |
| 40 | 2.7 | 0.025 |
| 42 | 2.8 | 0.025 |
| 44 | 2.9 | 0.025 |
| 46 | 3.0 | 0.025 |
| 48 | 3.0 | 0.050 |

We claim:

1. A process for separating an emulsion, the process comprising: exposing an emulsion comprising a discontinuous phase and a non-conducting continuous phase to an electric field effecting coalescence of the discontinuous phase into droplets of a size for effective gravitation from the continuous phase, where the continuous phase and the discontinuous phase have different dielectric constants and densities and at least one of the phases comprises a silicon containing compound or silicon containing polymer.

2. A process according to claim 1, where the electric field is created by an alternating current potential applied to one or more electrodes.

3. A process according to claim 1, where the electric field is created by a direct current potential applied to one or more electrodes.

4. A process according to claim 1, where the continuous phase comprises a silicon containing compound or a silicon containing polymer.

5. A process according to claim 1, where the continuous phase is a silane described by formula $$R^1{}_a H_b SiX_{4-a-b},$$

where each $R^1$ is an independently selected monovalent hydrocarbon radical comprising 1 to about 12 carbon atoms, X is a halogen atom, a=0 to 4, b=0 to 2, and a+b=0 to 4.

6. A process according to claim 5, where $R^1$ is methyl and X is chlorine.

7. A process according to claim 1, where the continuous phase is a linear siloxane described by formula $$R^2 R^3{}_2 O(SiR^3 O)_z SiR^3{}_2 R^2,$$

where each $R^2$ is independently selected from the group consisting of halogen, hydroxy, and $R^3$; each $R^3$ is independently selected from the group consisting of hydrogen and monovalent hydrocarbon radicals comprising 1 to about 12 carbon atoms and z is a value within a range of 0 to about 100,000.

8. A process according to claim 7, where $R^2$ is methyl, $R^3$ is methyl, and z is a value within a range of 0 to about 200.

9. A process according to claim 1, where the continuous phase is a cyclic siloxane described by formula $$(R^3{}_2 SiO)_m,$$

where each $R^3$ is independently selected from the group consisting of hydrogen and monovalent hydrocarbon radicals comprising 1 to about 12 carbon atoms and m is a value within a range of 3 to about 20.

10. A process according to claim 9, where each $R^3$ is methyl and m is a value within a range of 3 to about 7.

11. A process according to claim 1, where the continuous phase is a silicone resin formed of units described by formulas $R^3{}_3 SiO_{1/2}$, $R^3{}_2 SiO_{2/2}$, $R^3 SiO_{3/2}$, and $SiO_{4/2}$, where each $R^3$ is independently selected from the group consisting of hydrogen and monovalent hydrocarbon radicals comprising 1 to about 12 carbon atoms.

12. A process according to claim 1, where the continuous phase is a polysilane described by formula $$R^4{}_3 Si(SiR^4{}_2)_n SiR^4{}_3,$$

where each $R^4$ is independently selected from the group consisting of hydrogen, halogen, and monovalent hydrocarbon radicals comprising 1 to about 12 carbon atoms and n is a value within a range of 0 to about 1,000.

13. A process according to claim 1, where the discontinuous phase is water.

14. A process according to claim 1, where the discontinuous phase is an aqueous acid.

15. A process according to claim 1, where the discontinuous phase is aqueous hydrogen chloride.

16. A process according to claim 1, where the continuous phase is a polydimethylsiloxane prepared by the hydrolysis of methylchlorosilanes, the discontinuous phase is aqueous hydrogen chloride, and water is added to the process to facilitate reduction of residual chlorine bonded to silicon atoms of the polydimethylsiloxane.

17. A process according to claim 1, where the electric field is created by a pulsed direct current potential applied to one or more electrodes.

18. A process according to claim 1, where the electric field is created by an electric potential having both alternating current and direct current characteristics applied to one or more electrodes.

19. A process for separating an emulsion, the process comprising exposing an emulsion comprising a discontinuous aqueous phase and a non-conducting continuous phase comprising a silicon containing compound or a silicon containing polymer to an electric field effecting coalescence of the aqueous phase into droplets of a size for effective gravitation from the silicon containing compound or silicon containing polymer.

20. A process for dehydrating a silicone polymer, the process comprising passing an emulsion comprising a discontinuous aqueous phase and a continuous phase comprising a polydiorganosiloxane through an electric field having an alternating current field component and a direct current field component, thereby effecting coalescence of the aqueous phase into droplets of a size sufficient for gravitation from the polydiorganosiloxane.

* * * * *